United States Patent
Branham

(10) Patent No.: US 7,002,524 B1
(45) Date of Patent: Feb. 21, 2006

(54) CONDUCTIVE BRACKET MOUNT FOR MIRROR AND ANTENNA ASSEMBLIES

(75) Inventor: Michael Dean Branham, Blythewood, SC (US)

(73) Assignee: Lang Mekra, North America, LLC, Ridgeway, SC (US)

( * ) Notice: Subject to any disclaimer, the term of this patent is extended or adjusted under 35 U.S.C. 154(b) by 0 days.

(21) Appl. No.: 10/952,129

(22) Filed: Sep. 28, 2004

(51) Int. Cl.
*H01Q 1/32* (2006.01)

(52) U.S. Cl. ........................... 343/713; 343/715

(58) Field of Classification Search ............. 343/711, 343/713, 715, 829
See application file for complete search history.

(56) References Cited

U.S. PATENT DOCUMENTS

| | | | | |
|---|---|---|---|---|
| 3,967,275 A | * | 6/1976 | Wagman | 343/713 |
| 4,134,120 A | | 1/1979 | DeLoach et al. | |
| 4,161,735 A | * | 7/1979 | Zylla | 343/713 |
| 5,687,035 A | * | 11/1997 | Lang | 359/864 |
| 5,798,882 A | | 8/1998 | Lang | |
| 6,031,923 A | | 2/2000 | Gnecco et al. | |
| 6,326,613 B1 | | 12/2001 | Heslin et al. | |
| 6,406,170 B1 | | 6/2002 | Abalos et al. | |
| 6,496,152 B1 | | 12/2002 | Nilsson | |

FOREIGN PATENT DOCUMENTS

| | | |
|---|---|---|
| DE | 2 064 794 | 12/1970 |
| GB | 2 157 633 A | 10/1985 |
| JP | 3-63612 | 3/1991 |

* cited by examiner

*Primary Examiner*—Shih-Chao Chen
(74) *Attorney, Agent, or Firm*—McNair Law Firm, P.A.

(57) ABSTRACT

A mounting assembly for mounting a mirror assembly and an antenna assembly with a vehicle cab including a radio which includes grounding the antenna assembly with the vehicle cab. The mounting assembly includes a conductive metal support rod connected with a mounting bracket formed of molded polymeric resin including a conductive filler. The antenna assembly includes an antenna mounted to a support which is secured with the support rod. Also, an antenna cable extends from the antenna through the mounting rod and the cab assembly in usual manner. The arrangement provides a conductive path to the vehicle cab and radio.

12 Claims, 4 Drawing Sheets

CONDUCTIVE BRACKET MOUNT FOR MIRROR AND ANTENNA ASSEMBLIES

BACKGROUND OF THE INVENTION

The instant invention is directed to a mounting assembly for mounting a mirror assembly and an antenna assembly with a vehicle cab which includes a radio to include a CB radio. It is necessary that such a mounting assembly be grounded with the vehicle cab in order for the signal received by the antenna to be transmitted to and received by the radio. The obvious solution for this is to provide that the mounting assembly is all metal.

It has also been found that the construction of metal mounting brackets, particularly mounting brackets with multi-dimensional shapes are difficult to produce, and therefore, are extremely expensive. In order to remedy this, in many instances, these types of mounting brackets are made of molded polymeric resins providing brackets with aesthetic appeal and structural strength but which are non-conductive. Also, the cost of producing molded plastic brackets is minimal when compared with like metal brackets.

In order to use brackets formed of polymeric material with a mounting assembly which mounts an antenna mounting assembly, a conductive connection between the metal support rod and the vehicle cab must be provided. This is normally accomplished by connecting conductive ground wires with the support rod, passing these wires by the molded mounting bracket and connecting the wires with the vehicle cab. Care must be taken to locate the wires in an unobtrusive position so as to not be readily seen or be easily snagged. The system which incorporates these conductive wires with the support apparatus is time-consuming and expensive to install. Also, there is always the possibility of a broken connection.

The instant invention has as its primary object the provision of an inexpensive conductive molded support bracket for a mounting assembly for mounting a mirror assembly and an antenna assembly.

Another object of the invention is the provision of a mounting assembly mounting an antenna assembly which provides a fail safe ground with the vehicle cab assembly.

Another object of the invention is to provide an easily installable mounting, mirror and antenna assembly.

Another object of the invention is the provision of a mounting bracket for a mounting assembly formed of a compound comprising a polymeric resin and a conductive filler.

Another object of the invention is a mounting assembly for a mirror assembly and an antenna assembly which is easily installed with a vehicle cab.

Another object of the invention is a mounting bracket for use with a mounting assembly for a mirror assembly and an antenna assembly which is formed of a conductive component of nylon and carbon.

SUMMARY OF THE INVENTION

A mounting assembly for mounting a mirror assembly and an antenna assembly with a vehicle cab assembly carrying a CB radio. The mounting assembly includes an upper and a lower mounting bracket, each secured with the cab assembly and with the supporting ends of a conductive mounting rod. At least one of the mounting brackets is formed of a compound of a polymeric resin combined with electrically conductive filler.

The mirror mounting assembly is carried by the support rod between its opposed ends. The antenna mounting assembly is carried by the support rod and the antenna is grounded with the support rod, establishing a conductive path between the antenna, the mounting bracket and the cab assembly.

The polymeric material forming the mounting bracket is preferably nylon and the conductive filler is preferably carbon. The preferred ratio is about 30% filler and about 70% nylon. It is noted that other suitable polymeric resins and conductive fillers may be used. Also, it is preferred that only the polymeric resin forming the upper mounting bracket is molded with the conductive filler added.

The mounting rod is formed of a metal rod and is generally c-shaped. The mounting rod may be connected at opposite ends with the connecting brackets. Preferably, a mounting rod attachment member is secured with the mounting rod ends and functions to attach the mounting rod with the mounting bracket. The mounting rod attachment member is molded from a compound comprising a polymeric resin and a conductive filler, preferably the same compound forming the upper mounting bracket.

The upper mounting bracket includes an outer surface with a mounting rod connector, a stabilizing rod connector and a plurality of apertures. The mounting rod connector is constructed to engage with a mounting rod attachment member, pivotally securing the mounting rod with the mounting bracket. The stabilizing rod includes a stabilizer rod attachment member which pivotally secures with the stabilizing rod connector. The opposite end of the stabilizing rod includes an adjustable bracket which secures with the mounting rod at adjustable locations. The lateral position of the mirror assembly and the antenna assembly is adjustably fixed with the stabilizer rod.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
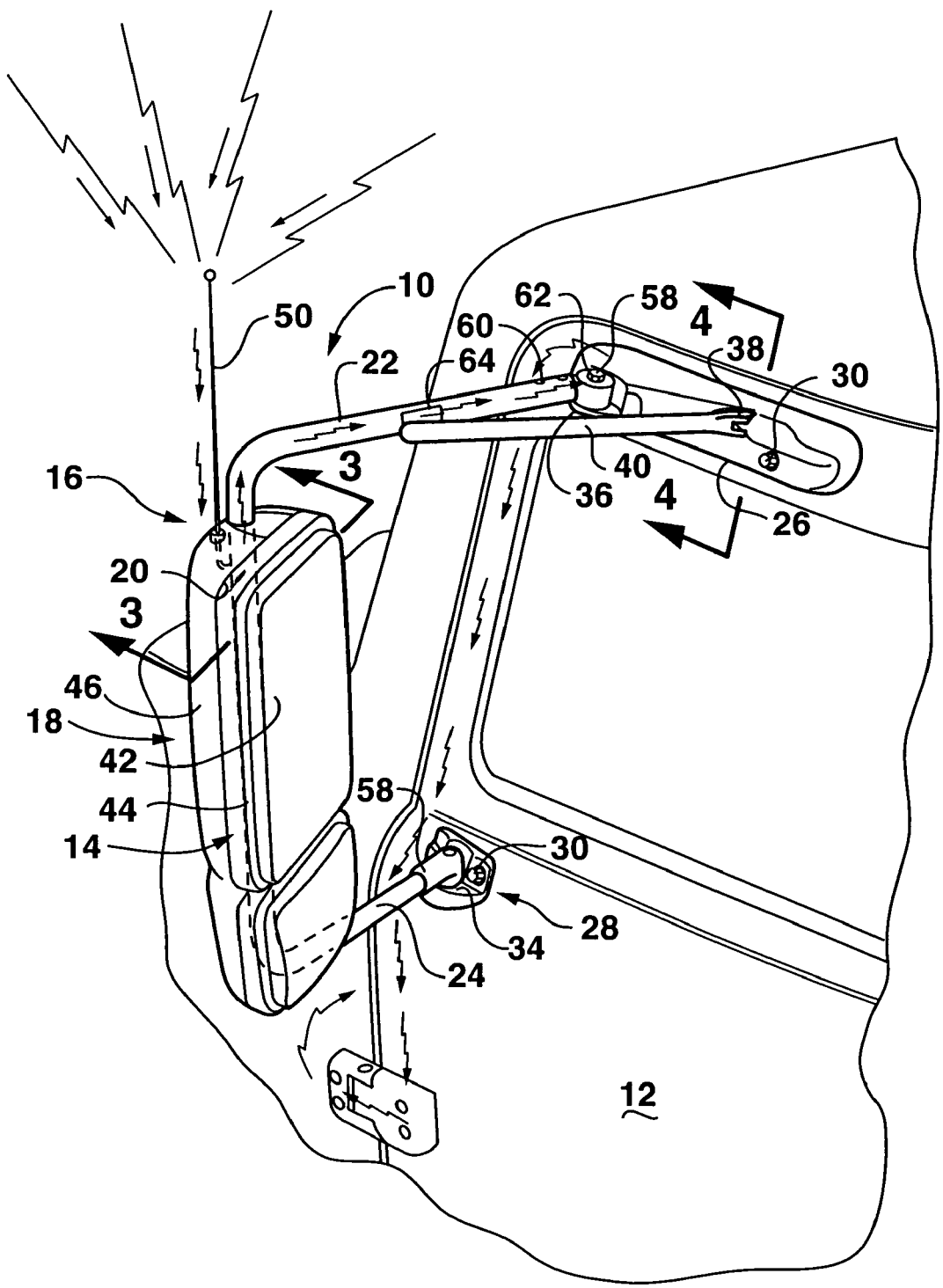
FIG. 1 is a perspective sectional view of the mounting assembly for mounting a mirror mounting assembly and an antenna mounting assembly.

Referring now to the drawings, the invention will now be described in more detail.

Figure 2:
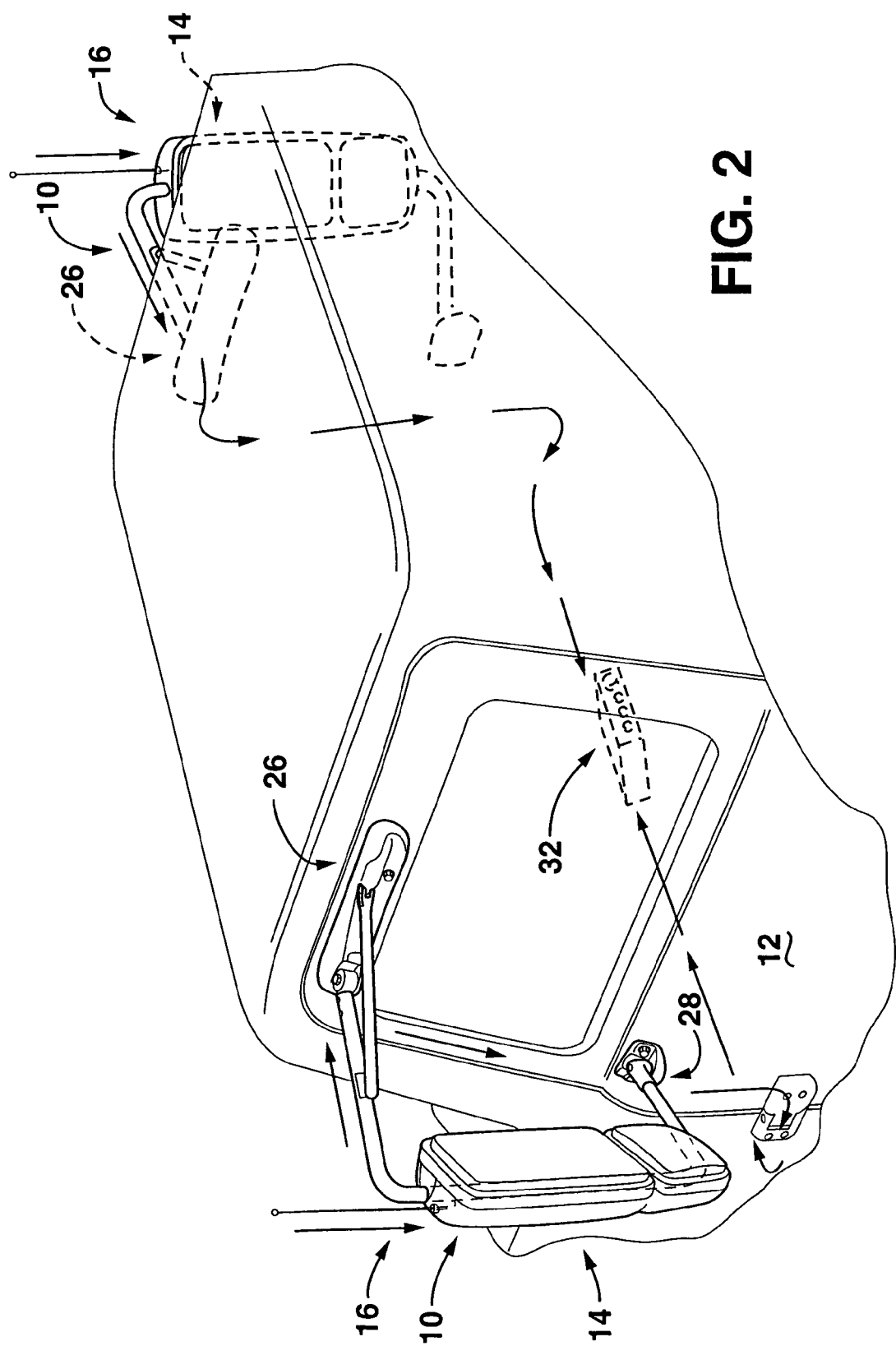
FIG. 2 is similar to FIG. 1, showing the arrangement on both sides of the cab.

Turning now to FIGS. 1 and 2, a mounting assembly 10 is shown for mounting a mirror assembly 14 and an antenna assembly 16 with the cab assembly 12 of a vehicle. The cab assembly carries a radio 32, which is normally a CB radio, as shown in FIG. 2. In most instances, the mounting, mirror and antenna assemblies 10, 14 and 16 are arranged in pairs, one on each side of vehicle cab 12 as shown in FIG. 2. Also, normally the radio 32 along with the mounting, mirror and antenna assemblies 10, 14 and 16 are grounded with cab 12 providing conductive communication therebetween as is illustrated by the arrows in FIGS. 1 and 2.

Each mounting assembly 10 comprises a generally C-shaped mounting rod 18 which includes a pair of generally parallel extensions 22, 24 and an intermediate extension 20 arranged generally transverse thereof. Mirror assembly 14 and antenna assembly 16 are secure within intermediate extension 20, while parallel extensions 22, 24 secure with vehicle cab 12.

Figure 3:
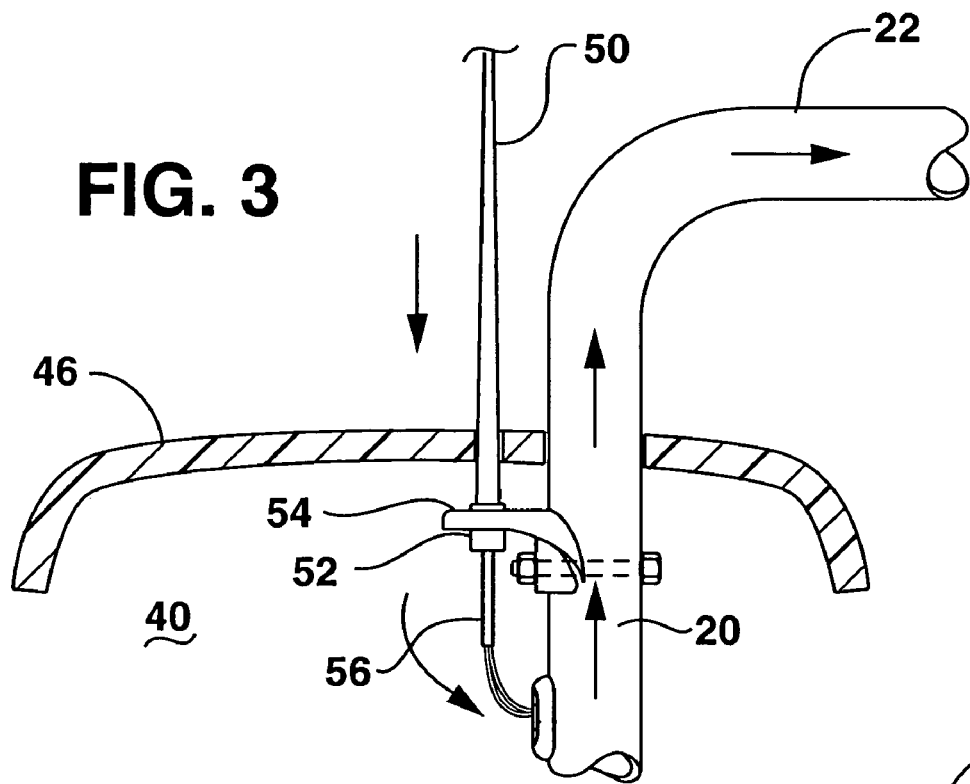
FIG. 3 is a sectional exploded view of the antenna mounting assembly.
Figure 4:
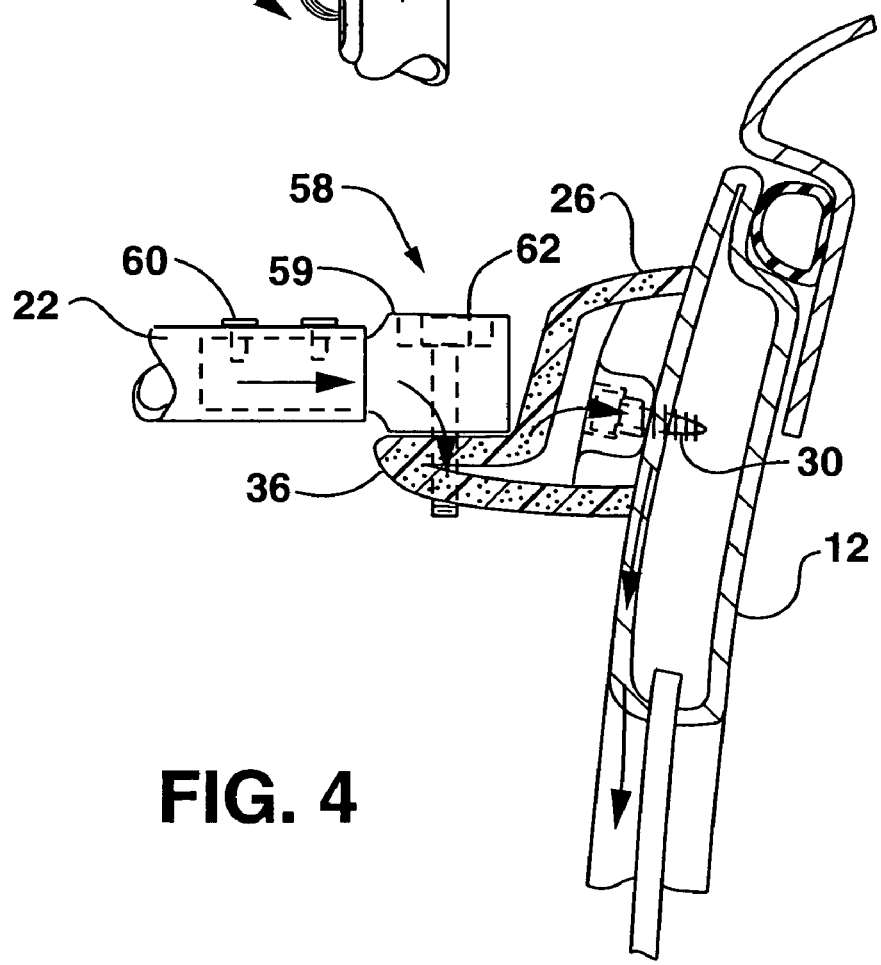
FIG. 4 is a sectional exploded view of the mounting bracket connecting with the connecting rod and the vehicle door.

Mirror mounting assembly 14, is of known construction to include a mirror 42 secured with a mirror mounting component 44 which is secured with intermediate extension 20 of mounting rod 18 in a usual manner. A shell 46, which includes an inner open area 40, see FIG. 3, secures with mounting rod 18 and with mirror mounting component 44 in a usual manner to provide a protective covering for the mounting component. Intermediate extension 20 of mounting rod 18 may comprise a unitary connecting piece extending between and connecting parallel extensions 22, 24 or it may comprise separate members extending from the upper and lower parallel extensions. In this instance, the mirror mounting support would engage with the opposed ends of these members forming the generally C-shaped mounting rod.

Shell 46 includes an opening which receives antenna 50 of antenna mounting assembly 16. Base 52 of antenna 50 mounts with antenna support 54 in a usual manner. Antenna cable 56 extends from base 52 downward and through an opening in extension 20 of mounting rod 18, through mounting bracket 28, through cab assembly 12 to connect with radio 32 in the usual manner. Antenna support 54 is generally L-shaped with its vertical extension engaged with mounting rod 18 with its horizontal portion in position to support antenna base 52. Antenna 50 grounds with mounting rod 18 through support 54.

An upper and a lower mounting bracket 26, 28 is provided for connecting with the free ends of parallel extensions 22, 24 and with vehicle cab 12. Lower mounting bracket 28 includes a pair of recesses for receiving bolts 30 which secure it with the door of vehicle cab 12 below the window. Mounting bracket 28, on its outer surface has a rod connector member 34, which secures with the end of parallel extension 22 in a usual manner. Upper mounting bracket 26 secures with the door of vehicle cab 12 above the window as shown. Upper mounting bracket 26 is an elongated member having spaced recesses for receiving bolts 30 which engage in and secure the bracket with vehicle cab 12. In the general vicinity of the forward end of the recesses is formed rod connector 36 for engaging with the end of parallel extension 22. Arranged generally adjacent the rear recess of mounting bracket 26 is a stabilizing rod connector 38 for mounting an end of stabilizing rod 40.

Mounting rod 18 is preferably formed to carry rod attachment members 58. Each attachment member includes an extension which fits into the ends of mounting rod 18 and is secured in position with metal screws 60. The attachment members also include a head 59 which receives through an aperture metal bolt 62 which secures the mounting rod with the upper and lower mounting brackets. A stabilizing rod 40, which is of adjustable length, secures at one end with stabilizing rod connector 38 of upper mounting bracket 26 and with mounting rod 18, preferably along upper extension 22. A bracket 64 which engages in adjustable positions with mounting 18 is carried by the opposite end of stabilizing rod 40. The stabilizing rod allows the position of the mounting assembly to be adjusted relative to the vehicle cab 12 by selecting the position of engagement of bracket 64 with rod extension 20. The stabilizing rod maintains the mounting assembly in the selected position.

Figure 5:
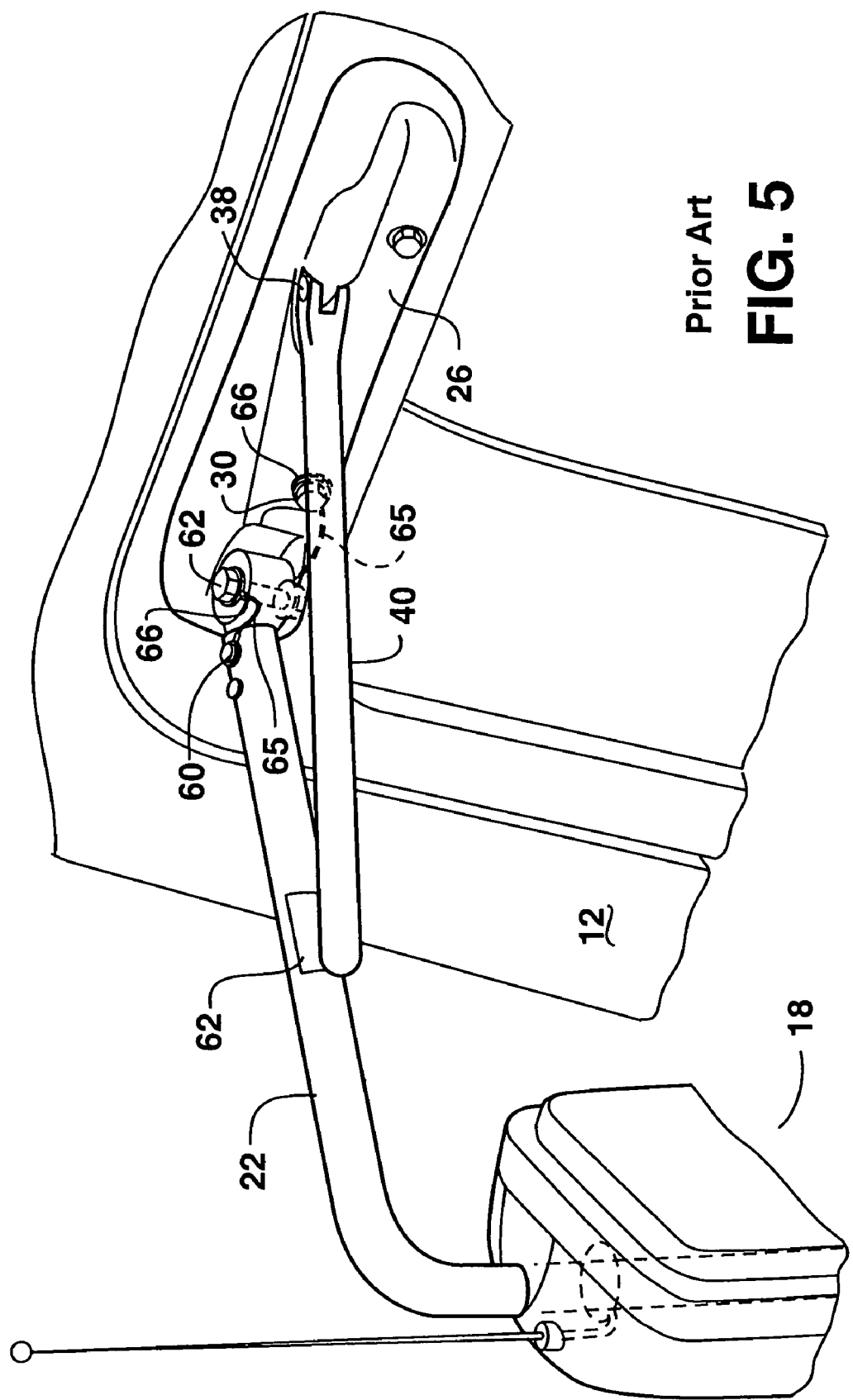
FIG. 5 is a sectional view of the prior art arrangement for which the instant invention is an improvement.

Normally, the mounting brackets 26, 28 along with the mounting rod attachment members are generally made of molded plastic members. This plastic material has been non-conductive, which requires the inclusion of additional conductive leads. As shown in FIG. 5, a ground assembly, which includes a lead wire 65 attached at opposed ends with attachment rings 66, is utilized to ground the support rod 18 with vehicle cab 12. In practice, a first ring 66 of a first ground assembly is engaged under screw 60. The second ring 66 of the first ground assembly along with a first ring 66 of a second ground assembly is connected with bolt 62 which secures the support rod 18 with mounting bracket 26. The second ring 66 of the second ground assembly is secured by bolt 30 which is engaged with vehicle cab 12 forming a ground between support rod 18 and the vehicle cab 12.

This arrangement has proved to be error prone during assembly, labor intensive and break prone. Should a wire 65 become caught and separate from a ring 66, the ground between the radio and the antenna is broken. Should a ring not be connected with a bolt, the ground is not established. Finally, two additional manual steps are required during assembly.

In order to eliminate these shortcomings, the instant invention provides that the polymeric resin forming mounting brackets 26, 28 along with the mounting rod attachment members 58 is formulated to include a conductive compound in sufficient quantity to be sufficiently conductive to ground mounting rod 18 with vehicle cab 12, while at the same time, retaining sufficient strength to withstand the pressures created against the mounting assembly during normal use and when the vehicle is in motion. It has been found that a polymeric compound comprising about 70% nylon and 30% carbon is most satisfactory. Of course, other polymeric resins which include suitable strength, resilient and durability qualities may also be used as well as other conductive components.

The instant mounting assembly 10 along with the instant antenna assembly 16 is grounded with cab assembly 12 through the conductive molded compound forming the mounting bracket 26. Likewise, radio 32 is grounded with the cab assembly in a usual manner.

It is noted that while the CB radio antenna assembly is shown mounted inside the mirror shell, the invention is equally applicable where the antenna assembly is mounted with support rod 18 outside of the mirror shell.

While a preferred embodiment of the invention has been described using specific terms, such description is for illustrative purposes only, and it is to be understood that changes and variations may be made without departing from the spirit or scope of the following claims.

What is claimed is:

1. A mounting assembly for mounting a mirror assembly and an antenna assembly with a vehicle cab assembly grounded with a radio comprising:

upper and lower mounting brackets secured with said cab and supporting ends of a conductive mounting rod, at least one of said mounting brackets being formed of a molded compound of polymeric resin and an electrically conductive filler;

said mirror assembly being connected with and carried by said mounting rod;

said antenna assembly being connected with and carried by said mounting rod grounding said antenna assembly with said mounting rod; whereby said mounting rod, and said at least one mounting bracket provide a conductive path between said antenna assembly and said cab assembly, grounding said antenna assembly.

2. The mounting assembly of claim 1 wherein said upper mounting bracket is formed of said compound.

3. The mounting assembly of claim 1 wherein said mounting rod comprises a unitary c-shaped metal member.

4. The mounting assembly of claim 1 wherein said upper bracket includes a mounting rod connector for connecting with an end of said mounting rod, a stabilizer rod connector for connecting with a stabilizing rod, and mounting receptacles for receiving screws securing said mounting bracket with said cab.

5. The mounting assembly of claim 4 wherein said stabilizer rod connects pivotally at a first end with said stabilizer rod connector and at an opposite end thereof with said mounting rod.

6. The mounting assembly of claim 1 including a mounting rod attachment members connected with said ends of said mounting rod, said mounting rod attachment members engaging with said mounting brackets securing said mounting rod with said mounting brackets, at least one of said mounting rod attachment members being molded of said compound.

7. The mounting assembly of claim 1 wherein said polymeric resin comprises nylon and said filler comprises carbon.

8. The mounting assembly of claim 1 wherein said filler comprises carbon which constitutes between 25% and 35% of said compound.

9. The mounting assembly of claim 1 including a pair of said mounting assemblies on opposed sides of said vehicle cab, each said mounting assembly including said mounting brackets.

10. A mounting assembly for mounting a mirror mounting assembly and an antenna mounting assembly with a vehicle cab assembly carrying a radio, said mounting assembly comprising:

a conductive mounting rod supporting said mirror mounting assembly and said antenna mounting assembly;

a conductive mounting bracket molded of a compound including a polymeric resin and a conductive filler, said mounting bracket securing said mounting rod with said vehicle cab;

said antenna mounting assembly including a support platform and a ground secured with said mounting rod; whereby said antenna mounting assembly is grounded with said cab assembly through said mounting rod and said mounting bracket.

11. The mounting assembly of claim 10 wherein said mirror mounting assembly includes a housing carried by said mounting rod, said housing having an enclosed interior area, said antenna mounting assembly being located within said interior area.

12. The mounting assembly of claim 11 wherein said housing includes an aperture on its upper end, an antenna carried by said antenna mounting assembly passing through said aperture.

* * * * *